US008880534B1

(12) United States Patent
Aradhye et al.

(10) Patent No.: US 8,880,534 B1
(45) Date of Patent: Nov. 4, 2014

(54) VIDEO CLASSIFICATION BOOSTING

(75) Inventors: Hrishikesh Balkrishna Aradhye, Santa Clara, CA (US); Mehmet Emre Sargin, Mountain View, CA (US)

(73) Assignee: Google Inc., Mountain View, CA (US)

( * ) Notice: Subject to any disclaimer, the term of this patent is extended or adjusted under 35 U.S.C. 154(b) by 124 days.

(21) Appl. No.: 13/275,864

(22) Filed: Oct. 18, 2011

Related U.S. Application Data

(60) Provisional application No. 61/394,470, filed on Oct. 19, 2010.

(51) Int. Cl.
*G06F 7/00* (2006.01)
*G06F 17/30* (2006.01)

(52) U.S. Cl.
CPC ............... *G06F 17/30784* (2013.01); *G06F 17/30817* (2013.01)
USPC .......................................... 707/748; 707/749

(58) Field of Classification Search
CPC ..................... G06F 17/30784; G06F 17/30817
USPC .................................................. 707/748, 749
See application file for complete search history.

(56) References Cited

U.S. PATENT DOCUMENTS

| | | | |
|---|---|---|---|
| 7,043,473 B1 | 5/2006 | Rassool et al. | |
| 7,966,632 B1 * | 6/2011 | Pan et al. | 725/46 |
| 8,037,051 B2 * | 10/2011 | Franks et al. | 707/708 |
| 2002/0099694 A1 * | 7/2002 | Diamond et al. | 707/3 |
| 2007/0255755 A1 * | 11/2007 | Zhang et al. | 707/104.1 |
| 2009/0083260 A1 * | 3/2009 | Artom et al. | 707/5 |
| 2009/0138505 A1 * | 5/2009 | Purdy | 707/104.1 |
| 2011/0167061 A1 * | 7/2011 | Li et al. | 707/728 |

OTHER PUBLICATIONS

Cao, L., et al., "Annotating photo collections by label propagation according to multiple similarity cues," in *Proc. of the 16th ACM international conference on Multimedia*. ACM, 2008, pp. 121-130, can be retrieved at <URL:http://www.ifp.illinois.edu/~cao4/papers/MM08_propagation.pdf>.
Freund, Y., et al., "A decision-theoretic generalization of on-line learning and an application to boosting," in *Computational learning theory*, 1995, 35 Pages.
Gilbert, X., et al., "Sports video classification using hmms," in *ICME*, Jul. 2003, pp. II-345-II-348. vol. 2.
Kokiopoulou, E., et al., "Video face recognition with graph-based semi-supervised learning," in *ICME*, Jun. 2009, pp. 1564-1565.

(Continued)

*Primary Examiner* — Mariela Reyes
(74) *Attorney, Agent, or Firm* — Fenwick & West LLP

(57) ABSTRACT

A video classification score boosting method boosts classification scores for videos for increased accuracy. A target video is classified with a classifier, producing a classification score. Related video scores are determined using the classifier for sets of videos related to the target video. The sets of related videos may include co-browsed videos, co-commented videos, co-queried videos, and co-uploaded videos. The related video scores may be the mean or median classification score for the classified sets of related videos. Weighting coefficients associated with the classifier are retrieved and applied to the classification score and the related video scores. The weighting coefficients may be determined for the classifier by classifying sets of pre-classified videos with the classifier and determining the weighting coefficients which, when applied to the classification scores of the pre-classified videos, improves the accuracy of the classification scores. A boosted classification score is determined based on the weighted classification score and related video scores.

29 Claims, 4 Drawing Sheets

(56) References Cited

OTHER PUBLICATIONS

Leung, T., et al., "Representing and recognizing the visual appearance of materials using three dimensional textons," *International Journal of Computer Vision*, vol. 43, No. 1, pp. 29-44, 2001.

Lin C.-J., et al., "Newton's Method for Large Bound-Constrained Optimization Problems," Society for Industrial and Applied Mathematics, 1999, vol. 9, No. 4, pp. 1100-1127.

Lowe, D.G., "Distinctive image features from scale invariant keypoints," *International Journal of Computer Vision*, vol. 60, No. 2, pp. 91-110, 2004.

Nister, D., "Scalable recognition with a vocabulary tree," in *CVPR*, 2006, vol. 2, pp. 2161-2168, can be retrieved at <URL:http://rangers.googlecode.com/files/nister_stewenius_cvpr2006.pdf>.

Oztekin, B.U., et al., "Query smearing: Improving classification accuracy and coverage of search results using logs," in *Computer and Information Sciences*, 2009. ISCIS 2009. 24th International Symposium on, Sep. 2009, pp. 135-140.

Rasheed, Z., et al., "On the use of computable features for film classification," *IEEE Transactions on Circuits and Systems for Video Technology*, vol. 15, No. 1, pp. 52-64, Jan. 2005.

Rouvier, M., et al., "On-the-fly video genre classification by combination of audio features," in *ICASSP*, Mar. 2010, pp. 45-48.

Sargin, M., et al., "Boosting Video Classification Using Cross-Video Signals," ICASSP 2011, pp. 1805-1808.

Toderici, G., et al., "Finding meaning on youtube: Tag recommendation and category discovery," in *CVPR*, 2010, 8 pages, can be retrieved at <URL:http://research.google.com/pubs/archive/35651.pdf>.

Truong, B.T., et al., "Automatic genre identification for content-based video categorization," in *ICPR*, 2000, vol. 4, pp. 230-233.

Viola, P., et al., "Rapid Object Detection Using a Boosted Cascade of Simple Features," Conference on Computer Vision and Pattern Recognition, 2001, pp. 1-9.

Wang, Z., et al., "Youtubecat: Learning to categorize wild web videos," in *CVPR*, Jun. 2010, pp. 879-886, can be retrieved at <URL:http://gb.cw.com.tw/m2m-0000/www.sanjivk.com/YouTubeCat_CVPR10.pdf>.

Wu, S., "Video quality classification based home video segmentation," in *ICME*, Jul. 2005, 4 pages.

Zanetti, S., et al., "A walk through the web's video clips," in *CVPR*, Jun. 2008, pp. 1-8.

Zhang, H.J., et al., "Automatic partitioning of full-motion video," *Multimedia Systems*, vol. 1, No. 1, pp. 10-28, 1993.

Anderson, R., A local algorithm for finding dense subgraphs, In Proc. 19th Annual ACM-SIAM Symposium on Discrete Algorithms, 2008, pp. 1003-1009.

Blum, A. et al., "Combining labeled and unlabeled data with co-training," In Proc. 11th Annual Conference on Computational Learning Theory, COLT, Jul. 1998, pp. 92-100.

Davison, B. D., "Topical locality in the web," In Proc. 23rd Annual International ACM SIGIR Conference on Research and Development in Information Retrieval, 2004, pp. 272-279.

Dekel, O., et al., "Large margin hierarchical classification," Proceedings of the 21st International Conference on Machine Learning, Banff, Canada, 2004, 8 pages.

Deng, J., et al., "ImageNet: A Large-Scale Hierarchical Image Database," IEEE Computer Society Conference on Computer Vision and Pattern Recognition, Jun. 22, 2009, pp. 248-255.

Dumais, S., et al., "Hierarchical classification of web content," In SIGIR '00: Proceedings of the 23rd annual international ACM SIGIR conference on Research and development in information retrieval, pp. 256-263, New York, NY, USA, 2000. ACM.

Fan, R.-E., et al., "Liblinear: A library for large linear classification," Journal of Machine Learning Research, 2008, pp. 1871-1874, vol. 9.

Freund, Y., et al., "A decision-theoretic generalization of on-line learning and an application to Boosting," Journal of Computer and System Sciences, 1997, pp. 119-139, vol. 55, article No. SS971504.

Goldman, S., et al., "Enhancing supervised learning with unlabeled data," In Proc. 17th International Conference on Machine Learning, 2000, pp. 327-334.

Guillaumin, M., et al., "Multimodal semi-supervised learning for image classification," In Proc. IEEE Conf. Computer Vision and Pattern Recognition, Jun. 2010, pp. 902-909.

Gupta, S., et al., "Watch, listen & learn: Co-training on captioned images and videos," In Proc. ECML PKDD, 2008, Part I, LNAI 5211, pp. 457-472.

Halevy, A., et al., "The unreasonable effectiveness of data," Intelligent Systems, IEEE, Mar. 2009, pp. 8-12, vol. 24, No. 2.

Huang, J., et al., "Exploring web scale language models for search query processing," In Proc. 19th international conference on World wide web, Apr. 26-30, 2010, pp. 451-460.

Koller, D., et al., "Hierarchically classifying documents using very few words," In the Proceedings of the Fourteenth International Conference on Machine Learning, ICML, Jul. 8-12, 1997, pp. 170-178.

Li, L.-J., et al., "Towards total scene understanding: Classification, annotation and segmentation in an automatic framework," In Proc. IEEE Conf. Computer Vision and Pattern Recognition, 2009, pp. 2036-2043.

Li, L.-J., et al., "Optimol: automatic object picture collection via incremental model learning," In Proc. IEEE Conf. Computer Vision and Pattern Recognition, 2007, 8 Pages.

Liu, T.-Y., et al., "Support vector machines classification with a very large-scale taxonomy," In SIGKDD Explorations, 2005, pp. 36-43, vol. 7, Issue 1.

Mahajan, D., et al., "Image classification using the web graph," In Proc. Multimedia, Oct. 25-29, 2010, pp. 991-994.

Neapolitan, R. E., et al., "Learning Bayesian Networks," Prentice-Hall, Inc., Upper Saddle River, NJ, USA, 2003, Cover page and Table of Contents, 7 Pages.

Niebles, J. C., et al., "Extracting moving people from internet videos," In ECCV '08: Proceedings of the 10th European Conference on Computer Vision, 2008, pp. 527-540, Part IV, LNCS 5305.

Schapire, R. E., "The boosting approach to machine learning: An overview," In MSRI Workshop on Non-linear Estimation and Classification, 2002, pp. 1-23.

Schindler, G., et al., Internet video category recognition. In Proc. First IEEE Workshop on Internet Vision, in CVPR, 2008, pp. 1-7.

Song, Y., et al., "Taxonomic classification for web-based videos," In Proc. IEEE Conf. Computer Vision and Pattern Recognition, Jun. 2010, pp. 871-878.

Sun, A., et al., "Hierarchical text classification and evaluation," In ICDM, 2001, pp. 521-528.

Tang, L., et al., "Large scale multi-label classification via metalabeler," In Proc. 18th International Conference on World Wide Web, Apr. 20-24, 2009, pp. 211-220.

Wang, Z., et al., "Youtubecat: Learning to categorize wild web videos," In Proc. IEEE Conf. Computer Vision and Pattern Recognition, Jun. 2010, pp. 879-886.

Zanetti, S., et al., "A walk through the web's video clips," In Proc. First IEEE Workshop on Internet Vision, in CVPR, 2008, 8 pages.

Zhu, X., Semi-supervised learning literature survey. In Tech Report. University of Wisconsin—Madison, Jul. 2008, pp. 1-60.

\* cited by examiner

VIDEO CLASSIFICATION BOOSTING

CROSS REFERENCE TO RELATED APPLICATIONS

The application claims the benefit of Provisional Application No. 61/394,470, filed on Oct. 19, 2010, which is incorporated herein by reference.

FIELD OF ART

The present disclosure generally relates to the field of digital video, and more specifically, to methods of improving the accuracy of video classification using related video classification scores.

BACKGROUND OF THE INVENTION

Video hosting systems, such as YOUTUBE or GOOGLE VIDEO, have become an increasingly popular way of sharing and viewing digital videos, with users contributing tens of millions of videos each year. Accurate categorization of a video is of great value in such systems, permitting users to search for videos corresponding to given categories, video hosting systems to more accurately match videos with relevant advertising, and the like.

However, the video information provided by the user who contributes a video often does not result in the correct categorization of the video. For example, for a set of predetermined categories including categories such as "Sports," "Baseball," "Tennis," and the like, a video titled with the name of a tennis player featured in the video may not in itself directly cause the video to be properly categorized as "Tennis" or "Sports" by a meta-data classifier.

Learning algorithms can be employed to train a classifier function (a "classifier") for a given category (e.g., "Tennis") that, when applied to features of a video (such as metadata of the video), outputs a measure of the relevance of the video to the category. Then, the trained classifier for a given category can be applied to a given video and the resulting measure of relevance can be used to determine whether the video is included in that category. Such classifiers are applied only to features of the video being classified, without consideration of external information, and are thus classifying the video based on analysis of an incomplete set of information, negatively affecting the accuracy of the classifiers. Accordingly, video classifiers that classify a video based only on features of the video itself, and which do not take into account external information, are not as effective as could be desired.

SUMMARY

A video classification score boosting method boosts classification scores for videos for increased accuracy. A target video is classified using a classifier, producing a classification score. Sets of videos related to the target video are identified, for example, co-browsed videos, co-commented videos, co-queried videos, and/or co-uploaded videos. The related videos are classified using the classifier, and a related video classification score is determined for each set of related videos. The related video scores are based on the classification scores for the videos in each set of related videos. A set of weighting coefficients associated with the classifier is retrieved. The set of weighting coefficients are applied to the classification score of a target video and the related video scores, producing a weighted classification score and weighted related video scores, which are then combined to produce a boosted classification score of the video. The set of weighting coefficients is determined such that accuracy of the combination of the classification score of the video with the related video scores and the weighting coefficients is improved relative to the classification score of the video alone.

The set of weighting coefficients include a weighting coefficient associated with the classifier to weight the classification score of a target video, and a respective weighting coefficient associated with each set of related videos, to respectively weight the related video scores. To determine the weighting coefficients, each video in a set of training videos is scored with the classifier. For each of the training videos, corresponding sets of videos are identified and classified with the classifier, producing a corresponding set of related video classification scores. Weighting coefficients are then determined which, when applied to each of the training video classification scores and the corresponding related video scores, result in more accurate boosted classification scores than the pre-classified training video classification scores alone.

Once a set of weighting coefficients are determined during training for a particular classifier, the weighting coefficients are applied to the classification score of a target video and the related video classifications scores, producing a weighted classification score and weighted related video scores. In one embodiment, the target video's classification score and each of the related video scores are multiplied by the weighting coefficient associated with the classification score and the set of related videos associated with each related video score, respectively. A boosted classification score is determined for the target video, for instance by adding the weighted classification score and the weighted related video scores. A weighting bias may optionally be added to the boosted classification score to improve classification score accuracy. In one embodiment, the method described herein can be applied to media and data other than videos.

In one embodiment, a classification score boosting system boosts classification scores for videos for increased accuracy. The system determines a classification score for a target video using a classifier, and then determines related video classification scores for sets of videos related to the target video. A set of weighting coefficients is retrieved and applied to the classification score and the related video classification scores to produce a boosted classification score. The boosted classification score is then stored, for instance, in a memory. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments for purposes of illustration only. One skilled in the art will readily recognize from the following description that alternative embodiments of the structures and methods illustrated herein may be employed without departing from the principles of the invention described herein.

DETAILED DESCRIPTION SYSTEM ARCHITECTURE

Figure 1:
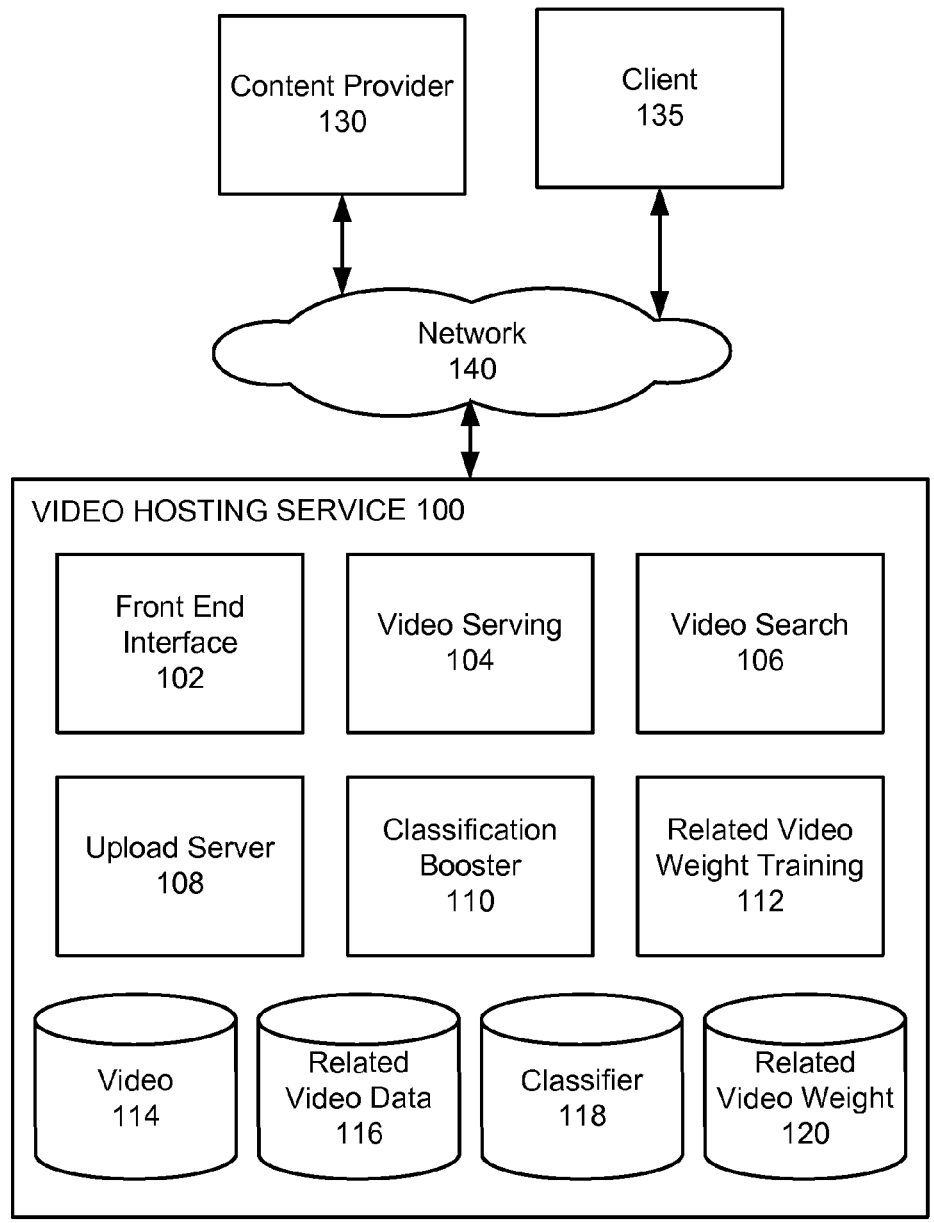
FIG. 1 is a block diagram of a video hosting service in which classification boosting can be employed, according to one embodiment.

FIG. 1 is a block diagram of a video hosting service in which classification boosting can be employed. The video hosting service 100 represents a system such as that of YOU-TUBE™ that stores and provides videos to clients such as the client 135. The video hosting service 100 communicates with a plurality of content providers 130 and clients 135 via a network 140 to facilitate sharing of video content between users. The video hosting service 100 may be implemented in a cloud computing network, accessible by the content providers 130 and the clients 135 over the network 140. Note that for the sake of clarity FIG. 1 depicts only one instance of content provider 130 and client 135, though in practice there will large numbers of each. It should be noted that the classification boosting discussed herein is equally applicable to media objects other than video (for example, images and audio objects such as music files), and to other data objects (for example, documents and spreadsheets), though the description herein is primarily directed to video objects solely for the purpose of simplicity.

The video hosting service 100 additionally includes a front end interface 102, a video serving module 104, a video search module 106, an upload server 108, a classification booster module 110, a related video weight training module 112, a video storage module 114, a related video data storage module 116, a classifier storage module 118, and a related video weight module 120. Other conventional features, such as firewalls, load balancers, authentication servers, application servers, failover servers, site management tools, and so forth are not shown so as to more clearly illustrate the features of the video hosting service 100. While an example of a suitable service 100 is the YOUTUBE website, found at www.youtube.com, other video hosting sites are known, as well, and can be adapted to operate according to the teachings disclosed herein. The illustrated components of the video hosting service 100 can be implemented as single or multiple components of software or hardware. In general, functions described in one embodiment as being performed by one component can also be performed by other components in other embodiments, or by a combination of components. Furthermore, functions described in one embodiment as being performed by components of the video hosting service 100 can also be performed by one or more clients 135 in other embodiments if appropriate.

Clients 135 are computing devices that execute client software, e.g., a web browser or built-in client application, to connect to the front end interface 102 of the video hosting service 100 via a network 140 and to display videos. The client 135 might be, for example, a personal computer, a personal digital assistant, a cellular, mobile, or smart phone, or a laptop computer. The network 140 is typically the Internet, but may be any network, including but not limited to a LAN, a MAN, a WAN, a mobile wired or wireless network, a private network, or a virtual private network.

Generally, the content provider 130 provides video content to the video hosting service 100 and the client 135 views that content. In practice, content providers may also be content viewers. Additionally, the content provider 130 may be the same entity that operates the video hosting service 100. The content provider 130 operates a client to perform various content provider functions. Content provider functions may include, for example, uploading a video file to the video hosting service 100, editing a video file stored by the video hosting service 100, or editing content provider preferences associated with a video file.

The client 135 may also be used to configure viewer preferences related to video content. In some embodiments, the client 135 includes an embedded video player such as, for example, the FLASH player from Adobe Systems, Inc. or any other player adapted for the video file formats used in the video hosting service 100.

The upload server 108 of the video hosting service 100 receives video content from a client 135. Received content is stored in the video storage module 114. In response to requests from a client 135, a video serving module 104 provides video data from the video storage module 114 to the client 135. Clients 135 may also search for videos of interest stored in the video storage module 114 using a video search module 106, such as by entering textual queries containing keywords of interest. The front end interface 102 provides the interface between the clients 135 and the various components of the video hosting service 100.

The classification booster module 110 classifies videos and boosts video classification scores using video information for videos related to the classified videos (hereinafter "target videos"). The classification booster module 110 is explained in greater detail below, in conjunction with FIG. 3. The related video weight training module 112 determines the weight coefficients used by the classification booster module 110 to boost the classification scores of sets of video related to target videos (hereinafter "related video scores"). The related video weight training module 112 is explained in greater detail below, in conjunction with FIG. 4.

The video storage module 114 contains videos submitted by the content providers 130. The video storage module 114 can contain any number of videos, such as tens of thousands or hundreds of millions. Each of the videos has a unique video identifier that distinguishes it from each of the other videos, such as a textual name (e.g., the string "a91qrx8"), an integer, or any other way of uniquely naming a video. The videos can be packaged in various containers such as WebM, 3GPP, AVI, MP4, MPEGPS, WMV, FLV or MOV, and can be encoded using video codecs such as MPEG-2, MPEG-4, H.264, Vp8, FLV1, and the like. In addition to their audiovisual content, the videos further have associated metadata, e.g., textual metadata such as a title, description, and/or tags provided by a content provider 130 who uploaded the video.

The related video data storage module 116 contains data describing the relationships between videos. In one embodiment, the related video data is organized in such a way that it can be queried for a target video (using, for example, the video's unique video identifier), and data identifying videos related to the target video is retrieved. In one embodiment, the related video data is organized into video sets, such that querying the data for a target video yields sets of videos related to the target video. The videos in each related video set may have a particular characteristic in common with the target video.

One example characteristic by which a target video may be related to another video is by having a threshold number of users of the video hosting service 100 that have browsed both the target video and the other video. As used herein, "browsing" refers to selecting the video for playback, for instance from recommended video suggestions, from links shared by other users, from external websites, from search results, or from any other source. A set of videos related in this manner are referred to herein as "co-browsed videos". It should be noted that any number of users who have browsed both a target video and another video, such as 5 users or 1 user, may be used as a threshold in order for the video to qualify as a co-browsed video. In one embodiment, in order for a video to qualify as a co-browsed video, a user must have browsed both the video and the target video within a minimum threshold of time, for instance within 1 day or 2 hours, within a maximum number of videos selected, for instance 10 videos, or within a single viewing session.

Another example characteristic by which a target video may be related to another video is by having a threshold number of users of the video hosting service 100 that have commented on both the target video and the other. A user may comment on the video via the front end interface 102, and the comments may be displayed in conjunction with the videos to subsequently viewing users of the videos. A set videos related in this manner is referred to herein as "co-commented videos". It should be noted that any number of users who have commented on both a target video and another video may be used as a threshold in order for the video to qualify as a co-commented video. In one embodiment, in order for a video to qualify as a co-commented video, a user must have commented on both the video and the target video within a minimum threshold of time.

Another example characteristic by which a target video may be related to another video is by having a threshold number of users of the video hosting service 100 that have uploaded both the target video and the other video. A user may upload the videos using the front end interface 102 and the upload server 108. A set of videos related in this manner is referred to herein as "co-uploaded videos". It should be noted that any number of users who have uploaded both a target video and another video may be used as a threshold in order for the video to qualify as a co-uploaded video. In one embodiment, in order for a video to qualify as a co-uploaded video, a user must have uploaded both the video and the target video within a minimum threshold of time, or within a maximum number of uploaded videos.

Another example characteristic by which a target video may be related to another video is by having a threshold number of users of the video hosting service 100 that have selected both the target video and the other video in response to the same search query. A user may search for videos using the front end interface 102 and the video search module 106. Video results may be displayed to the user, and if a threshold number of users clicks on both a video and the target video, the video is part of the set of related videos referred to herein as "co-queried videos". It should be noted that any number of users who have selected both a target video and another video in response to the same query may be used as a threshold in order for the video to qualify as a co-queried video. Co-queried video data may come from query logs of previous video search queries stored in the related video data 116.

Sets of related videos may have characteristics in common with a target video other than those described above. For example, for a target video and another video, a threshold number of users may have watched both the target video and the other video for a minimum amount of time. A set of videos related in this manner is referred to herein as "co-watched" videos. In one embodiment, in order for a video to qualify as a co-watched video, a user must have watched both the video and the target video within a minimum threshold of time. In one embodiment, any video feature related to user activity may be used to identify a set of videos related to a target video.

Another example characteristic by which a target video may be related to another video is by having common video features, such as image, sound, meta data, or other feature information. A set of videos related in this manner is referred to herein as "co-feature" videos. Any other suitable characteristic may be used to identify a set of videos related to a target video. For the purposes of simplicity, the remainder of the description of sets of related videos will be limited to co-browsed videos, co-commented videos, co-uploaded videos, and co-queried videos. It should be noted that there can be overlap between sets of related videos. For example, for a particular target video, one or more videos may belong to one or more of the sets of co-browsed videos, co-commented videos, co-uploaded videos, co-queried videos, etc.

For purposes of explanation, the foregoing related video sets can be denoted as follows. For a given target video $T_i$, there are the following sets of related videos:

$R_{Bi}$: videos co-browsed with video $T_i$;
$R_{Ui}$: videos co-uploaded with video Ti;
$R_{Ci}$: videos co-commented with video $T_i$;
$R_{Qi}$: videos co-queried with video $T_i$.

The union of these sets is denoted simply as $R_i$. Assuming n different set of related videos, the individual sets for target video $T_i$ are enumerated as $R_{ni}$.

The classifier storage module 118 contains one or more classifiers which may be used to classify videos. In one embodiment, each classifier classifies each video on the basis of whether or not the video has a particular property. The classifiers may produce a classification score on the interval [0.0, 1.0]. The classification score represents the confidence of the classifier that the classified video has the property for which the classifier tests. For example, if a video is classified by a "baseball" classifier, and the resulting classification score is 0.74, this classification score indicates a 74% confidence or probability that the video contains baseball subject matter. In other embodiments of this example, the classification score may be any suitable interval [a, b] where a and b are real numbers, and where a classification score x, such that a<x<b, indicates a confidence or probability that the video contains baseball subject matter.

Each classifier stored in the classifier storage module 118 is configured to classify videos for particular category, property, or characteristic (herein "features"). The classifiers can include classifiers for semantic categories. For example, the classifiers may classify videos with respect to categories such as "sports", "baseball", "football", "pornography", "racy", and the like. The classifiers can also classify videos based on video quality. For example, the classifiers may classify videos as "high", "medium", or "low" resolution, and so forth. The classifiers can also include classifiers that identify whether or not speech or text appears in the videos, or whether the videos contain music. Classifiers may classify a video based on any other suitable video property or metadata, including but not limited to the producer or creator of the video, the genre of the video, video features, actors in the video, video subject matter, and music or other audio in the video.

The classifiers stored in the classifier storage module 118 classify videos by analyzing video features. In one embodiment, the classifiers classify videos by analyzing color distributions, for example, using 4×4 pixel hue and saturation histograms, the mean and variance of the color intensities for each color channel and each video frame, the difference between the mean color intensities inside and outside of a central image rectangle, or any other video property related to color. The classifiers can also use edge information, for example using a Canny edge detection algorithm to identify edges and the compute the fraction of edge pixels in detected edges, an edge direction histogram, and the mean edge energy for pixels.

The classifiers may also use video texture, for example using a texton histogram. The texton histogram contains a texton vocabulary, which may be built using hierarchical K-Means to cluster textures. The classifiers may also use facial detection for classification, for example using a face detection algorithm such as that found in Viola's and Jones's "Rapid object detection using a boosted cascade of simple features," *CVPR*, vol. 1, pp. I-511-I-518 (2001), the contents of which are hereby incorporated by reference. Videos may be classified based on the number of faces in a video, the identity of the faces in a video, and the ratio of the largest face area to the image area where the faces are detected.

The classifiers may classify videos by analyzing the motion in videos, for example using the cosine distance between the color histograms of two consecutive frames or a binary value extracted for each frame indicating the shot boundaries of the frame. Alternatively, the classifiers may classify videos by analyzing the audio of the videos, for example by computing the audio volume and the coefficients of the 32-bin audio spectrogram. The classifiers may classify videos by analyzing the visual words displayed in the video, for example using interest points detected on video frames using Laplacian-of-Gaussian filters or Gabor wavelet texture features, and clustered using hierarchical K-means.

The classifiers stored in the classifier storage module 118 may include the classifiers described in U.S. patent application Ser. No. 12/874,015, filed Sep. 9, 2010, the contents of which are hereby incorporated by reference. Alternatively, the classifiers stored in the classifier storage module 118 may include any suitable video classifier which classifies videos based on a given video property and which produce a classification score representing the probability that the classified video contains the property. The classification score produced by a given classifier $C_k$ for a target video $T_i$ is denoted as $T_{k,i}$. The related video scores produced by a given classifier $C_k$ for the sets of related videos $R_{Bi}$, $R_{Ci}$, $R_{Qi}$, and $R_{Ui}$ are denoted $B_{k,i}$, $C_{k,i}$, $Q_{k,i}$, and $U_{k,i}$, respectively.

The related video weight storage module 120 stores a set of weighting coefficients $w_k$ for each classifier $C_k$. The weighting coefficients are used to weight the classification score and related video scores for a given target video and classifier in order to produce the boosted classification score, $TB_{k,i}$. The weighting coefficient for the classification score $T_{k,i}$, is denoted $w_{k,T}$. Likewise, the weighting coefficients for the related video scores $B_{k,i}$, $C_{k,i}$, $Q_{k,i}$, and $U_{k,i}$ are denoted $w_{k,B}$, $w_{k,C}$, $w_{k,Q}$, and $w_{k,U}$, respectively. The weighting coefficients are described below in greater detail in regards to FIGS. 2 through 4.

Figure 2:
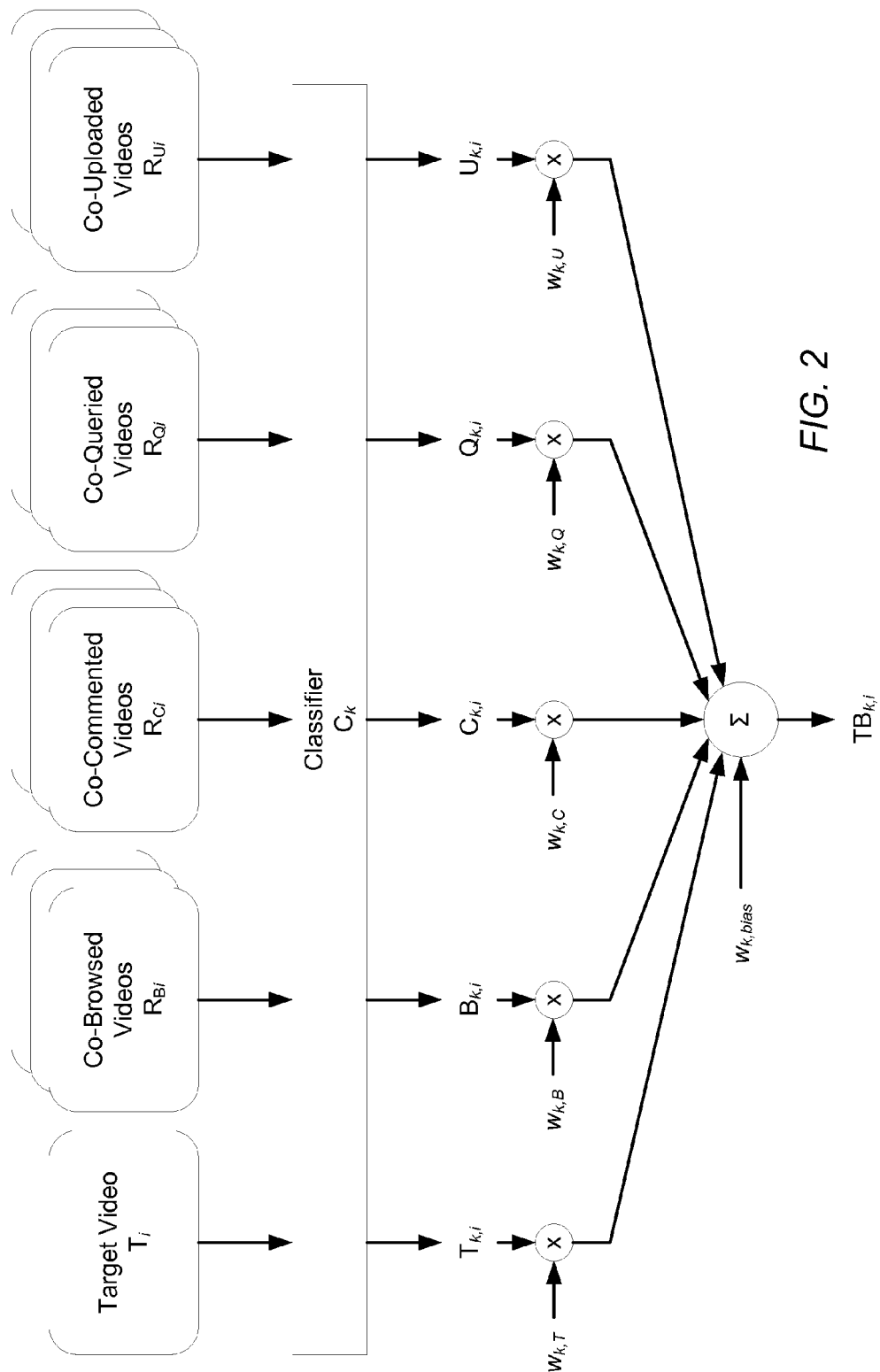
FIG. 2 is a data flow diagram illustrating an overview of the boosting of a classification score using related video scores and weighting coefficients, according to one embodiment.

FIG. 2 is a data flow diagram illustrating an overview of the boosting of a classification score using related video scores and weighting coefficients, according to one embodiment. The target video $T_i$ is classified with the classifier $C_k$, producing the classification score $T_{k,i}$. Similarly, a set of co-browsed videos $R_{Bi}$, a set of co-commented videos $R_{Ci}$, a set of co-queried videos $R_{Qi}$, and a set of co-uploaded videos $R_{Ui}$ are classified, producing related video scores $B_{k,i}$, $C_{k,i}$, $Q_{k,i}$, and $U_{k,i}$, respectively.

In the embodiment of FIG. 2, the classification score $T_{k,i}$ is multiplied by the weighting coefficient $w_{k,T}$, the related video score $B_{k,i}$ is multiplied by the weighting coefficient $w_{k,B}$, the related video score $C_{k,i}$ is multiplied by the weighting coefficient $w_{k,C}$, the related video score $Q_{k,i}$ is multiplied by the weighting coefficient $w_{k,Q}$, and the related video score $U_{k,i}$ is multiplied by the weighting coefficient $w_{k,U}$. The sum of these products, plus a bias coefficient $w_{k,bias}$, is used as the boosted classification score $TB_{k,i}$. The boosting of the classification score described in FIG. 2 can be denoted with the equation:

$$TB_{k,i}=T_{k,i}w_{k,T}+B_{k,i}w_{k,B}+C_{k,i}w_{k,C}+Q_{k,i}w_{k,Q}+U_{k,i}w_{k,U}+w_{k,bias}$$

Figure 3:
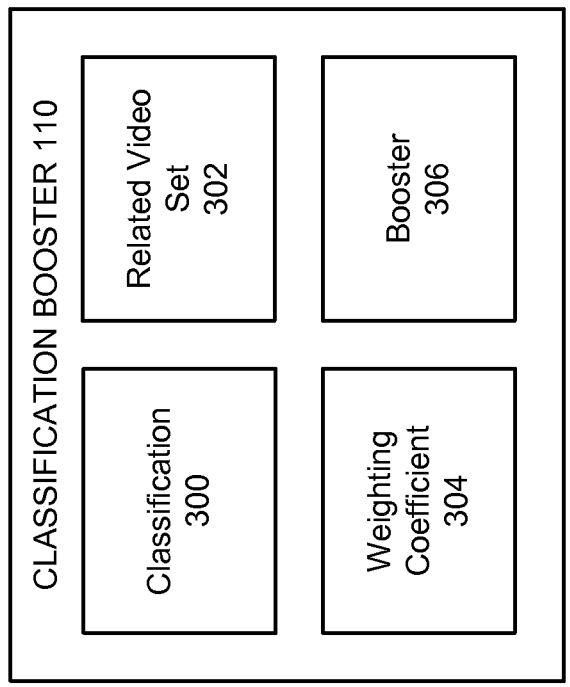
FIG. 3 illustrates the various components of the classification booster module of FIG. 1, according to one embodiment.

FIG. 3 illustrates the various components of the classification booster module 110 of FIG. 1, according to one embodiment. The classification booster module 110 includes a classification module 300, a related video set module 302, a weighting coefficient module 304, and a booster module 306. The classification booster module 110 classifies a video $T_i$, producing a classification score $T_{k,i}$, and boosts this score using related video scores and associated related video weights.

The classification module 300 accesses a classifier $C_k$ from the classifier storage module 118 and classifies a target video $T_i$, producing a classification score $T_{k,i}$. The related video set module 302 retrieves the identities of sets of videos $R_i$ related to the target video $T_{k,i}$ from the related video data storage module 116. For each related video set $R_{ni}$, the classification module 300 classifies the videos in the related video set $R_{ni}$, and determines a related video score for the entire related video set. In one embodiment, each video in a related video set $R_{ni}$ is classified, and the related video score is the median or mean classification score for the related video set $R_{ni}$. As discussed above, the related video scores for the set of co-browsed videos, the set of co-commented videos, the set of co-queried videos, and the set of co-uploaded videos are $B_{k,i}$, $C_{k,i}$, $Q_{k,i}$, and $U_{k,i}$, respectively. As discussed above, the related video set module 302 may retrieve additional sets of videos related to the target video $T_{k,i}$, though further description of such additional sets of videos is omitted for simplicity.

The related video set module 302 may retrieve the identities of only a subset of videos within a set of related videos $R_{ni}$. The related video set module 302 may retrieve the identities of the best examples of videos with a characteristic in common with a target video $T_i$ within a set of related videos $R_{ni}$. For example, the related video set module 302 may retrieve the top 5 or top 10 videos, or the top 5% or top 10% of videos that have been co-browsed, co-uploaded, co-commented or co-queried. The related video set module 302 may also retrieve videos that have been co-browsed, co-uploaded, co-commented and co-queried by the most users. In the event that there are no videos in a particular related video set $R_{ni}$, the related video score for the particular related video set is set to $T_{k,i}$.

The weighting coefficient module 304 retrieves the set of weight coefficients $W_k$ stored in the related video weight storage module 120 associated with the classifier $C_k$. The retrieved weight coefficients $W_k$ correlate to the target video $T_i$ and to the related video sets $R_i$ identified by the related video set module 302. For example, if the related video set module 302 retrieves the identities of co-browsed videos $R_{Bi}$, co-uploaded videos $R_{Ui}$, co-commented videos $R_{Ci}$ and co-queried videos $R_{Qi}$, the weighting coefficient module 304 retrieves the weight coefficient associated with the retrieved classifier for a target video, $w_{k,T}$, the weighting coefficient associated with the retrieved classifier for co-browsed videos, $w_{k,B}$, the weighting coefficient associated with the retrieved classifier for co-commented videos, $w_{k,C}$, the weighting coefficient associated with the retrieved classifier for co-queried videos, $w_{k,Q}$, and the weighting coefficient associated with the retrieved classifier for co-uploaded videos, $w_{k,Q}$.

The booster module 306 receives the classification score of the target video $T_i$, the related video scores from the classification module 300, and the weighting coefficients from the weighting coefficient module 304, and produces a boosted classification score $TB_{k,i}$ for the target video. The boosted classification score $TB_{k,i}$ may be determined based on the sum of the product of the classification score for the target video and the associated target video weight coefficient (the "weighted classification score"), and the products of the related video scores and the associated related video weight coefficients (the "weighted related video scores") as indicated in FIG. 2.

Figure 4:
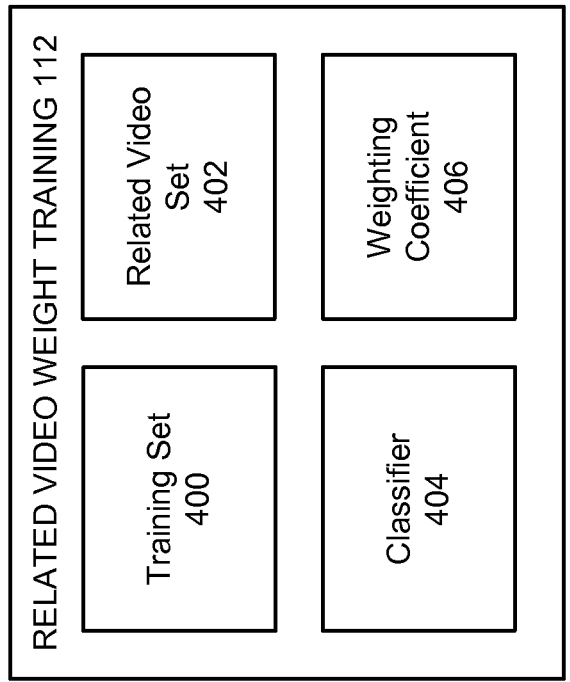
FIG. 4 illustrates the various components of the related video weight training module of FIG. 1, according to one embodiment.

FIG. 4 illustrates the various components of the related video weight training module 112 of FIG. 1, according to one embodiment. The related video weight training module 112 includes a training set module 400, a related video set module 402, a classifier module 404, and a weighting coefficient module 406. The related video weight training module 112 classifies a set of videos for which the classification is known in advance using a particular classifier $C_k$, producing a classification score for each video. The related video weight training module 112 then determines weighting coefficients associated with the classifier $C_k$ that, when applied to the classification score and related video scores, produce boosted classification scores for the pre-classified video which are more accurate than the original classification scores. Although description herein will focus on determining weighting coefficients for a single classifier, it should be noted that the related video weight training module 112 may determine a set of weighting coefficients for each classifier stored in the classifier storage module 118.

The training set module 400 retrieves a training set of pre-classified target videos, $T^*_i$, from the video storage module 114. For example, the training set module 400 may retrieve a training set of 10,000 videos which are pre-classified as "sports" and "not sports". In one embodiment, the training set of videos is split substantially evenly between each of two classifications.

The related video set module 402 retrieves the identities of sets of videos $R_i$ related to each video $T^*_i$ in the training set of videos from the related video data storage module 116. Similarly to the related video set module 302, the related video set module 402 may retrieve sets of co-browsed videos $R_{Bi}$, co-commented videos $R_{Ci}$, co-queried videos $R_{Qi}$, and co-uploaded videos $R_{Ui}$ for each video $T^*_i$. Different sets of related videos may also be retrieved, though the remainder of this description is limited to these four sets of related videos for the purposes of simplicity.

The classifier module 404 retrieves a classifier $C_k$ from the classifier storage module 118 and classifies each video $T^*_i$ in the training set of videos, producing a classification score, $T^*_{k,i}$, for each video in $T^*$. For each video $T^*_i$ The classifier module 404 also classifies each video in $R_{Bi}$, $R_{Ci}$, $R_{Qi}$, and $R_{Ui}$, and produces related video scores $B_{k,i}$, $C_{k,i}$, $Q_{k,i}$, and $U_{k,i}$, respectively. As discussed above, the related video scores may include the mean or median classification score for each set of related videos, or may be determined using another suitable method. The classification score and the related video scores collectively form the vector $p_{k,i}$, where $p_{k,i} = [T^*_{k,i}, B_{k,i}, C_{k,i}, Q_{k,i}, U_{k,i}]^T$.

The weighting coefficient module 406 determines, for the classifier $C_k$, the values of the weighting coefficients $w_{k,T}$, $w_{k,B}$, $w_{k,C}$, $w_{k,Q}$, and $w_{k,U}$ which collectively form the vector $w_k$, where $w_k = [w_{k,T}, w_{k,B}, w_{k,C}, w_{k,Q}, w_{k,U}]$. The weighting coefficients $w_k$, when applied to the vector $p_k$, produce the boosted classification score $TB^*_{k,i}$, such that $TB^*_{k,i} = w_k^T p_{k,i}$. The weighting coefficient module 406 determines the values of the weighting coefficients in such a way that, for a video $T^*_i$, the boosted classification score $TB^*_{k,i}$ predicts with greater accuracy the pre-classification of the video $T^*_i$ than the original classification score $T^*_{k,i}$ on average, across all the videos in $T^*$. It should be emphasized that the values of $w_k$ are associated only with the classifier $C_k$ used during training, and that the values of $w$ must be learned for each classifier separately.

The weighting coefficient module 406 may determine the values of $w_k$ for the classifier $C_k$ such that, for each training video $T^*_i$ and associated vector $p_{k,i}$, the weighting coefficient module 406 minimizes the classification error:

$$\sum_i \log\left(1 + e^{-y_i w_k^T p_{k,i}}\right) + .5 * \|w_k\|^2$$

wherein "$y_i$" represents the pre-classification of each video $T^*_i$, such that $y_i = 1$ for positive instances of pre-classification (using the above example, the video $T^*_i$ is pre-classified as "sports"), and $y_i = 0$ for negative instances of pre-classification (using the above example, the video $T^*_i$ is pre-classified as "not sports"). In one embodiment, the minimization is performed by the weighting coefficient module 406 using trust region Newton's method recursion as described in Lin's and More's "Newton's method for large bound-constrained optimization problems," *Society for Industrial and Applied Mathematics Journal on Optimization*, vol. 9, no. 4, pp. 1100-1127 (1999), the contents of which are hereby incorporated by reference. Alternatively, the weighting coefficient module 406 may minimize the above classification error using other forms of recursive approximation or other suitable methods, or may determine the values of $w_k$ that produce boosted classification scores that are more accurate than original classification scores using other suitable methods.

In some embodiments, the sum of the weighting coefficients $w_k$ used to boost a particular classification score may sum to 1, beneficially guaranteeing that if the classification score and related video scores are on the interval [0.0, 1.0], the boosted classification score will also be on the interval [0.0, 1.0]. In other embodiments, the sum of the weighting coefficients $w_k$ used to boost a particular classification score may sum to a number n, where n is any real number, and the boosted classification score will also be on the interval [0.0, n].

The biasing term $w_{k,bias}$ may be appended to the weight coefficient vector $w_k$, and the value 1 may be appended to each vector $p_{k,i}$ to accommodate for the biasing coefficient, allowing the weighting coefficient module 406 to optimize the classification boosting performed by the classification booster module 110. The weighting coefficient module 406 stores each determined set of weighting coefficient $w_k$ in the related video weight storage module 120 for later retrieval by the weighting coefficient module 304.

Figure 5:
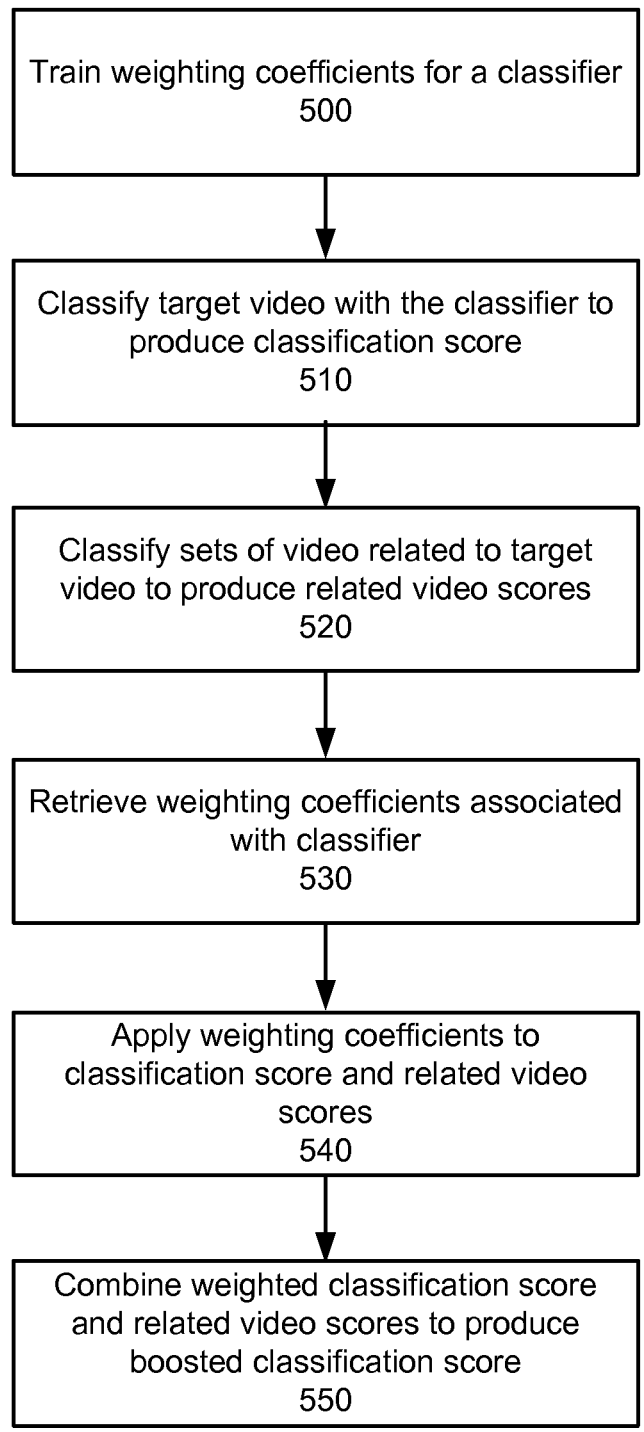
FIG. 5 is a flowchart of a process for boosting a classification score of a video, according to one embodiment.

FIG. 5 is a flowchart of a process for boosting a classification score of a video, according to one embodiment. It should be noted that although reference in this description is made to video, the process, method and system of FIGS. 1-5 may be applied to any type of media or data. In the process of FIG. 5, weighting coefficients $w_k$ are trained 500 for a classifier $C_k$. The weighting coefficients $w_k$ include a weighting coefficient $w_{k,T}$ to apply to a classification score $T_{k,i}$ of a target video $T_i$, as well as a weighting coefficient for related video scores used to boost the classification score. As discussed above, the values of the weighting coefficients $w_k$ may be determined recursively such that the boosting of the classification score using related video scores is optimized. The weighting coefficients $w_k$ may be trained for a particular classifier in advance.

A target video $T_i$ is classified 510 with the classifier $C_k$, producing a classification score $T_{k,i}$. The classifier $C_k$ tests for the presence of a particular video property. For example, the classifier $C_k$ may classify videos based on a video category, genre, feature or other video property. Sets of videos $R_i$ related to the target video $T_i$ are classified 520 with the classifier $C_k$, producing related video scores. The sets of videos $R_i$ related to the target video $T_i$ may include co-browsed videos $R_{Bi}$, co-commented videos $R_{Ci}$, co-queried videos $R_{Qi}$, and co-uploaded videos $R_{Ui}$. The related video scores may be the mean or median classification score for each classified set of related videos.

Weighting coefficients $w_k$ associated with the classifier $C_k$ are retrieved 530. A weighting coefficient $w_{k,T}$ is retrieved for the classifier itself and for each related set of videos classified by the classifier. The weighting coefficients $w_k$ are applied 540 to the classification score $T_{k,i}$ and related video scores to produce a weighted classification score and weighted related video scores. The weighted classification score and related video scores are summed 550 to produce a boosted classification score $TB_{k,i}$. A weighting bias $w_{k,bias}$ (determined during training 500) may be optionally added to the boosted classification score $TB_{k,i}$ in order to improve the accuracy of the classification boosting.

TABLE 1

Equal error rates (%) on classifications with baseline ($p_o$) and proposed ($p_f$) methods.

| Classification | # of stumps | $p_o$ | $p_f$ |
|---|---|---|---|
| Quality | 585 | 19.6 | 17.0 |
| Pornographic | 3000 | 18.5 | 14.3 |
| Racy | 3000 | 26.6 | 22.1 |
| Speech | 500 | 4.5 | 3.7 |

Table 1. Equal error rates (%) on classifications with baseline ($p_o$) and proposed ($p_f$) methods.

Table 1 illustrates the results of implementing the proposed method with a standard AdaBoost classifier without cross-video signals ($p_o$), and with cross-video signals ($p_f$). The "# of stumps" column indicates the number of stumps used in the AdaBoost classifier. The classification problems used in Table 1 are "Quality", "Pornographic", "Racy", and "Speech". In each classification problem, using cross-video signals in classification results in lower equal error rates than the baseline method.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer implemented method of boosting a video classification score, the method comprising:
 determining a classification score for a target video by classifying the target video with a classifier, wherein the classifier is specific to a property, and wherein the classification score for a video indicates a confidence that the video has the property associated with the classifier;
 identifying one or more sets of videos related to the target video;
 classifying each identified set of videos with the classifier;
 determining a related video score for each set of videos based on the classification of the set of videos with the classifier, each related video score indicating a confidence that a corresponding set of videos related to the target video has the property associated with the classifier;
 retrieving a set of weighting coefficients associated with the classifier, the set of weighting coefficients comprising a weighting coefficient associated with the classifier and a weighting coefficient associated with each set of videos related to the target video;
 determining a weighted classification score and weighted related video scores based on the classification score, the one or more related video scores, and the retrieved weighting coefficients;
 determining a boosted classification score for the target video based on the weighted classification score and weighted related video scores; and
 storing the boosted classification score.

2. The method of claim 1, wherein the classification score is on the interval [0.0, 1.0].

3. The method of claim 1, wherein the one or more sets of videos related to the target video comprise one or more of: co-browsed videos, co-commented videos, co-queried videos, and co-uploaded videos.

4. The method of claim 1, wherein determining a related video score comprises:
 determining a related video classification score for each video in a set of videos related to the target video by classifying each video with the classifier; and
 determining the median of the related video classification scores for the set of videos related to the target video.

5. The method of claim 1, wherein determining a related video score comprises:
 determining a related video classification score for each video in a set of videos related to the target video by classifying each video with the classifier; and
 determining the mean of the related video classification scores for the set of videos related to the target video.

6. The method of claim 1, wherein retrieving a set of weighting coefficients comprises determining the weighting coefficients for the classifier using a set of pre-classified training videos and sets of videos related to the pre-classified training videos.

7. The method of claim 6, wherein determining the weighting coefficients for the classifier comprises:
 determining a classification score for each video in the set of pre-classified training videos by classifying each video using the classifier;
 determining a related video score for each set of videos related to the videos in the set of pre-classified training videos; and
 determining weighting coefficients that, when combined with the classification scores and the related video scores to create boosted classification scores for the set of pre-classified training videos, result in the boosted classification scores being more accurate on average than the classification scores.

8. The method of claim 7, wherein the weighting coefficients are determined using trust region Newton's method recursion.

9. The method of claim 1, wherein determining a weighted classification score comprises multiplying the classification score by the weighting coefficient associated with the classifier.

10. The method of claim 1, wherein determining a weighted related video score comprises multiplying a related video score by the weighting coefficient associated with the related video score.

11. The method of claim 1, wherein determining a boosted classification score for the target video comprises adding the weighted classification score and the weighted related video scores.

12. The method of claim 11, wherein determining a boosted classified score for the target video further comprises adding a weighting bias to the sum of the weighted classification score and the weighted related video scores.

13. A non-transitory computer-readable storage medium having executable computer program instructions embodied therein for boosting a video classification score, actions of the computer program instructions comprising:
 determining a classification score for a target video by classifying the target video with a classifier, wherein the classifier is specific to a property, and wherein the classification score for a video indicates a confidence that the video has the property associated with the classifier;
 identifying one or more sets of videos related to the target video;
 classifying each identified set of videos with the classifier;
 determining a related video score for each set of videos based on the classification of the set of videos with the classifier, each related video score indicating a confidence that a corresponding set of videos related to the target video has the property associated with the classifier;
 retrieving a set of weighting coefficients associated with the classifier, the set of weighting coefficients comprising a weighting coefficient associated with the classifier and a weighting coefficient associated with each set of videos related to the target video;
 determining a weighted classification score and weighted related video scores based on the classification score, the one or more related video scores, and the retrieved weighting coefficients;
 determining a boosted classification score for the target video based on the weighted classification score and weighted related video scores; and
 storing the boosted classification score.

14. The non-transitory computer-readable storage medium of claim 13, wherein the classification score is on the interval [0.0, 1.0].

15. The non-transitory computer-readable storage medium of claim 13, wherein the one or more sets of videos related to the target video comprise one or more of: co-browsed videos, co-commented videos, co-queried videos, and co-uploaded videos.

16. The non-transitory computer-readable storage medium of claim 13, wherein determining a related video score comprises:
   determining a related video classification score for each video in a set of videos related to the target video by classifying each video with the classifier; and
   determining the median of the related video classification scores for the set of videos related to the target video.

17. The non-transitory computer-readable storage medium of claim 13, wherein determining a related video score comprises:
   determining a related video classification score for each video in a set of videos related to the target video by classifying each video with the classifier; and
   determining the mean of the related video classification scores for the set of videos related to the target video.

18. The non-transitory computer-readable storage medium of claim 13, wherein retrieving a set of weighting coefficients comprises determining the weighting coefficients for the classifier using a set of pre-classified training videos and sets of videos related to the pre-classified training videos.

19. The non-transitory computer-readable storage medium of claim 18, wherein determining the weighting coefficients for the classifier comprises:
   determining a classification score for each video in the set of pre-classified training videos by classifying each video using the classifier;
   determining a related video score for each set of videos related to the videos in the set of pre-classified training videos; and
   determining weighting coefficients that, when combined with the classification scores and the related video scores to create boosted classification scores for the set of pre-classified training videos, result in the boosted classification scores being more accurate on average than the classification scores.

20. The non-transitory computer-readable storage medium of claim 19, wherein the weighting coefficients are determined using trust region Newton's method recursion.

21. The non-transitory computer-readable storage medium of claim 13, wherein determining a weighted classification score comprises multiplying the classification score by the weighting coefficient associated with the classifier.

22. The non-transitory computer-readable storage medium of claim 13, wherein determining a weighted related video score comprises multiplying a related video score by the weighting coefficient associated with the related video score.

23. The non-transitory computer-readable storage medium of claim 13, wherein determining a boosted classification score for the target video comprises adding the weighted classification score and the weighted related video scores.

24. The non-transitory computer-readable storage medium of claim 23, wherein determining a boosted classified score for the target video further comprises adding a weighting bias to the sum of the weighted classification score and the weighted related video scores.

25. A computer system for boosting a video classification score, the system comprising:
   a computer processor; and
   a non-transitory computer-readable storage medium storing executable computer program instructions comprising:
      determining a classification score for a target video by classifying the target video with a classifier, wherein the classifier is specific to a property, and wherein the classification score for a video indicates a confidence that the video has the property associated with the classifier;
      identifying one or more sets of videos related to the target video;
      classifying each identified set of videos with the classifier;
      determining a related video score for each set of videos based on the classification of the set of videos with the classifier, each related video score indicating a confidence that a corresponding set of videos related to the target video has the property associated with the classifier;
      retrieving a set of weighting coefficients associated with the classifier, the set of weighting coefficients comprising a weighting coefficient associated with the classifier and a weighting coefficient associated with each set of videos related to the target video;
      determining a weighted classification score and weighted related video scores based on the classification score, the one or more related video scores, and the retrieved weighting coefficients;
      determining a boosted classification score for the target video based on the weighted classification score and weighted related video scores; and
      storing the boosted classification score.

26. The system of claim 25, wherein the one or more sets of videos related to the target video comprise one or more of: co-browsed videos, co-commented videos, co-queried videos, and co-uploaded videos.

27. The system of claim 25, wherein retrieving a set of weighting coefficients comprises determining the weighting coefficients for the classifier using a set of pre-classified training videos and sets of videos related to the pre-classified training videos.

28. The system of claim 27, wherein determining the weighting coefficients for the classifier comprises:
   determining a classification score for each video in the set of pre-classified training videos by classifying each video using the classifier;
   determining a related video score for each set of videos related to the videos in the set of pre-classified training videos; and
   determining weighting coefficients that, when combined with the classification scores and the related video scores to create boosted classification scores for the set of pre-classified training videos, result in the boosted classification scores being more accurate on average than the classification scores.

29. A computer implemented method of boosting a media classification score, the method comprising:
   determining a classification score for a target media object by classifying the target media object with a classifier, wherein the classifier is specific to a property, and wherein the classification score for a media object indicates a confidence that the media object has the property associated with the classifier;
   identifying one or more sets of media objects related to the target media object;
   classifying each identified set of media objects with the classifier;
   determining a related object score for each set of media objects based on the classification of the set of media objects with the classifier, each related object score indicating a confidence that a corresponding set of media objects related to the target media object has the property associated with the classifier;

retrieving a set of weighting coefficients associated with the classifier;

determining a boosted classification score for the target media object based on the classification score, the related object scores, and the retrieved weighting coefficients; and storing the boosted classification score.

* * * * *